US011303516B2

(12) United States Patent
Oakley et al.

(10) Patent No.: US 11,303,516 B2
(45) Date of Patent: Apr. 12, 2022

(54) SYSTEMS AND METHODS FOR LARGE SCALE OTA FIRMWARE UPDATE

(71) Applicant: Shure Acquisition Holdings, Inc., Niles, IL (US)

(72) Inventors: William J. Oakley, Grayslake, IL (US); Haneef Charania, Glenview, IL (US); Gary Oswald, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 105 days.

(21) Appl. No.: 16/545,884

(22) Filed: Aug. 20, 2019

(65) Prior Publication Data

US 2020/0059400 A1 Feb. 20, 2020

Related U.S. Application Data

(60) Provisional application No. 62/719,943, filed on Aug. 20, 2018.

(51) Int. Cl.
*H04L 41/082* (2022.01)
*H04W 76/10* (2018.01)
(Continued)

(52) U.S. Cl.
CPC ............. *H04L 41/082* (2013.01); *G06F 8/00* (2013.01); *G06F 8/65* (2013.01); *G06F 8/656* (2018.02);
(Continued)

(58) Field of Classification Search
CPC ..... H04L 41/082; H04L 67/32; H04L 65/403; H04M 1/72406; G06F 8/00; G06F 8/65; G06F 8/656; G06F 1/3212; H04W 76/10; H04W 8/22; H04W 52/0261; H04W 4/50; H04W 8/245; Y02D 10/00; Y02D 30/70
See application file for complete search history.

(56) References Cited

U.S. PATENT DOCUMENTS 7,881,745 B1 2/2011 Rao
8,166,164 B1 4/2012 Luna
(Continued)

FOREIGN PATENT DOCUMENTS

WO 2017160449 9/2017

OTHER PUBLICATIONS

Blackberry M2M Solutions, A Comparison of Protocols for Device Management and Software Updates, 2013, 5 pp.
(Continued)

*Primary Examiner* — Walter J Divito
(74) *Attorney, Agent, or Firm* — Neal, Gerber & Eisenberg LLP (57) ABSTRACT

Systems and methods for performing updates of a plurality of networked devices are disclosed. A system includes a plurality of wireless devices configured to operate using battery power, and a computing device remote from the plurality of wireless devices. The computing device is configured to wirelessly communicate with one or more of the plurality of wireless devices, determine a device list ranking the plurality of wireless devices based on respective remaining battery life of each wireless device, and sequentially update the plurality of wireless devices based on the device list.

18 Claims, 4 Drawing Sheets

(51) Int. Cl.

| | |
|---|---|
| *H04L 65/403* | (2022.01) |
| *H04W 8/22* | (2009.01) |
| *G06F 8/65* | (2018.01) |
| *G06F 8/656* | (2018.01) |
| *H04L 67/60* | (2022.01) |
| *G06F 8/00* | (2018.01) |
| *H04M 1/72406* | (2021.01) |
| *H04W 52/02* | (2009.01) |

(52) U.S. Cl.
CPC .......... *H04L 65/403* (2013.01); *H04L 67/32* (2013.01); *H04M 1/72406* (2021.01); *H04W 8/22* (2013.01); *H04W 76/10* (2018.02); *H04W 52/0261* (2013.01); *Y02D 10/00* (2018.01)

(56) References Cited

U.S. PATENT DOCUMENTS

| | | |
|---|---|---|
| 8,344,687 B2 | 1/2013 | Nishikawa |
| 8,402,455 B2 | 3/2013 | Seal |
| 8,594,850 B1 | 11/2013 | Gourlay |
| 9,046,898 B2 | 6/2015 | Mucignat |
| 9,098,279 B2 | 8/2015 | Mucignat |
| 9,913,216 B1 * | 3/2018 | Deshpande ........... H04W 28/14 |
| 9,952,645 B2 | 4/2018 | Chung |
| 2004/0031029 A1 | 2/2004 | Lee |
| 2008/0146292 A1 * | 6/2008 | Gilmore .............. H04M 1/6066 455/572 |
| 2009/0235246 A1 | 9/2009 | Seal |
| 2010/0020734 A1 | 1/2010 | Nakagawa |
| 2011/0231834 A1 | 9/2011 | Kim |
| 2016/0011887 A1 | 1/2016 | Chung |

OTHER PUBLICATIONS

IEEE, Preview: IEEE Technology Report on Wake-Up Radio: An Application, Market, and Technology Impact Analysis of Low-Power/Low-Latency 802.11 Wireless LAN Interfaces, Nov. 1, 2017, 12 pp.

International Search Report and Written Opinion for PCT/US2019/047282 dated Nov. 27, 2019, 13 pp.

* cited by examiner

SYSTEMS AND METHODS FOR LARGE SCALE OTA FIRMWARE UPDATE

CROSS-REFERENCE

This application claims priority to U.S. Provisional Patent Application No. 62/719,943, filed on Aug. 20, 2018, the contents of which are incorporated by reference herein in their entirety.

TECHNICAL FIELD

This application generally relates to systems and methods for efficiently performing firmware updates of a plurality of devices networked together.

BACKGROUND

Conferencing environments, such as conference rooms, boardrooms, video conferencing settings, auditoriums, and the like, typically involve the use one or more microphones for capturing sound from various audio sources active in such environments. The audio sources may include in-room human speakers, and in some cases, loudspeakers playing audio received from human speakers that are not in the room, for example.

Wireless communication devices, such as wireless microphones, include antennas for communicating radio frequency (RF) signals without the need for a physical cable. The RF signals can include digital or analog signals, such as modulated audio signals, data signals, and/or control signals. The antennas included in devices can be designed to operate in one or more certain spectrum bands, and may be designed to cover either a discrete set of frequencies within the spectrum band or an entire range of frequencies in the band. For example, devices used in a conferencing environment may communicate using 2.4 GHz or 5 GHz Wi-Fi bands for sending and receiving various data and control signals. In addition, the polarization of antennas and their radiation pattern in wireless communications devices may vary as the orientation of the devices changes, e.g., when a user holds a device to their ear or places it on a table, etc.

Over time, new functions, applications, programming, and other software or hardware techniques may be developed for use in connection with one or more wireless communication devices. A user of the devices may wish to update the wireless device in order to take advantage of these improvements. However, bandwidth problems, battery problems, and other issues with the wireless devices may cause an update to take a long time and/or fail to complete properly.

Accordingly, there is an opportunity for systems and methods that address these concerns, in particular by providing efficient use of resources when completing a firmware update of a plurality of wireless devices.

SUMMARY

The invention is intended to solve the above-noted and other problems by providing systems and methods for efficiently using resources during a firmware update of a plurality of wireless devices, such as a plurality of microphones.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Systems and methods are provided herein to enable a large scale over-the-air (OTA) firmware update to be completed in an efficient manner, making use of available resources to complete the update. Embodiments disclosed herein may enable firmware to be updated for a large number of networked devices based on their respective battery lives, connection statuses, and various other metrics. In a particular example, the networked devices may be wireless microphones positioned in an environment such as a conference, auditorium, or other location.

In an exemplary embodiment, a system may include many microphones or other battery-powered networked devices that are positioned throughout the environment. A user of the system may wish to perform a firmware update on all of the microphones. The system may include an access point transceiver (APT 120 in FIG. 1), which may provide communication between a user and the plurality of microphones. The APT may be limited in some respect to only performing some number of updates simultaneously. For instance, the APT may be bandwidth limited such that only three microphones (or some other number of microphones depending on what the particular system can handle) may be updated at a time. If the system includes more than three microphones, the APT may connect to all available microphones (or only a subset), but may only perform the firmware updates of three microphones at a time. The APT may then complete an update of all the available microphones by executing updates of the plurality of microphones in sequence.

Example embodiments of the present disclosure may order, rank, or otherwise organize the plurality of networked devices such that a maximum number of devices are updated. This may be done by factoring in each networked device's remaining battery life, battery age, time since the last charging event, number of charge cycles, connection status, current firmware information, and/or various other device characteristics or metrics. The system may then rank the networked devices based on these factors, in order to efficiently make use of the limited bandwidth for firmware updates in order to update the maximum number of networked devices.

The system may also enable a user to track the progress of the updates as they are carried out, the status of each networked device, the list of networked devices, and various other information. The user can also enable or disable the networked devices from shutting down after they have been updated. The user may select this option before, during, or after the updates have been completed. If the selection is made before or during the completion of the update, the user may be able to leave the microphones unattended and be confident they will all shut off when the update process is complete. This can be beneficial when the update process will take a significant amount of time (e.g., several hours) based on the size of the update and/or the number of devices being updated. The user can start the update at the end of his or her work day, and when he or she arrives the next day the devices will be updated and powered off thereby using as little battery life as possible.

While examples disclosed herein may be described with references to an access point transceiver (APT), microphones, and a user device, it should be understood that many other devices and systems may be used in place of these while remaining within the scope of this disclosure. For instance, the principles disclosed may be applied to any number or type of wireless networked devices, particularly those requiring firmware update(s) and those that operate mainly or exclusively on battery power.

Figure 1:
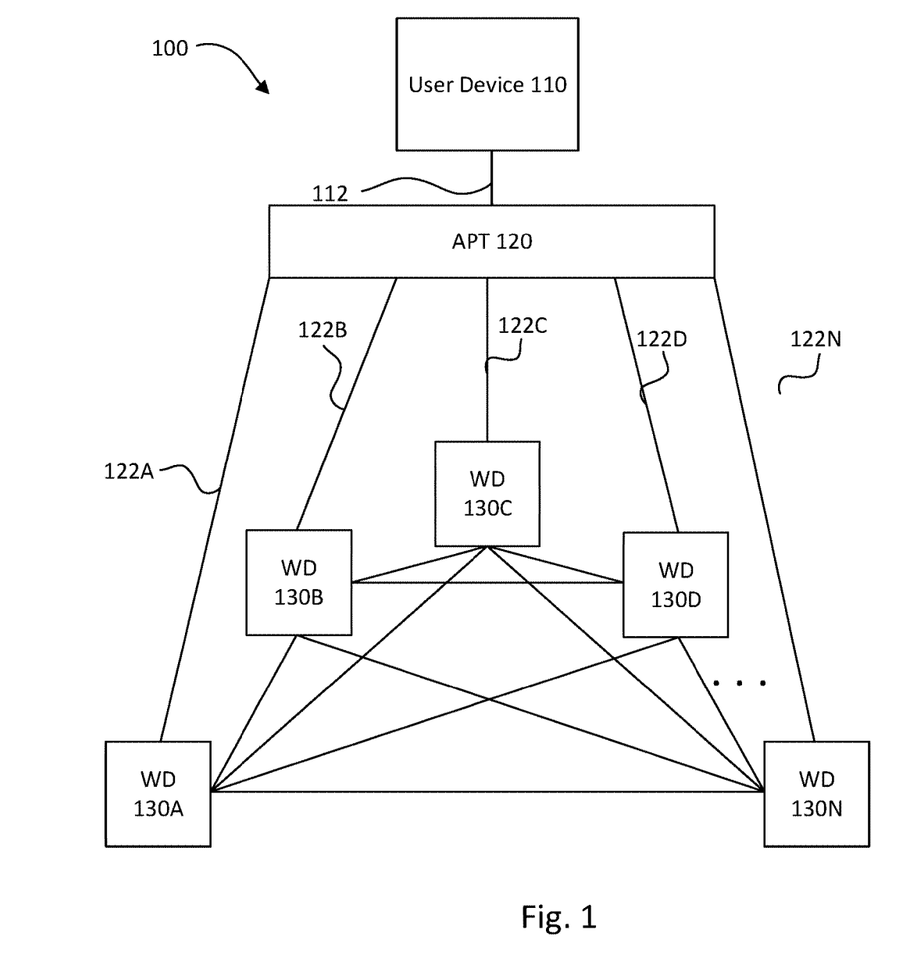
FIG. 1 is a block diagram illustrating an exemplary system in accordance with one or more embodiments.

FIG. 1 illustrates an example system 100 according to embodiments of the present disclosure. System 100 may include a user device 110, an APT 120, and a plurality of wireless devices (WDs) 130A-N. System 100 may be utilized in a variety of environments, such as a conference room, a boardroom, auditorium, or other environment where multiple WDs are used. In a specific example, system 100 may be used in a political context, such as the UN or other political space, where each seat or member may have a corresponding WD that is used as a microphone and/or for voting purposes.

Figure 2:
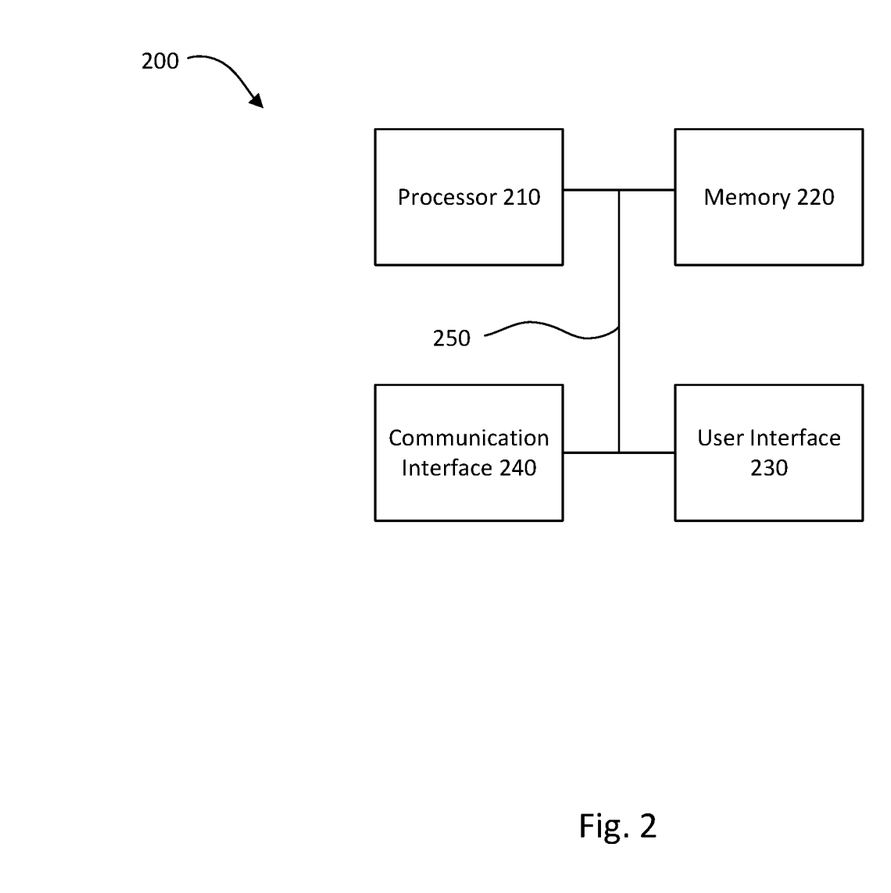
FIG. 2 is a block diagram illustrating an exemplary computing device of the system of FIG. 1 in accordance with one or more embodiments.

User device 110 may be any computing device, such as computing device 200 described with respect to FIG. 2. User device 110 may be a personal computer or laptop, phone, tablet, or another device that can be controlled by a user. In some examples, user device may be separate from APT 120, and may be communicatively coupled to APT 120 via a communication path 112. Alternatively, user device 110 may be coupled to or integrated with APT 120, and may act as a user interface for APT 120.

In some examples, user device 110 may be configured to initiate the firmware update process described herein. This may be done via input to the user device through a user interface. The user device 110 may also be configured to display information to a user via a screen or display of the user interface. This information is described in further detail in this disclosure, and may include status updates, WD metrics or characteristics, lists, rankings, and more. User device 110 may also provide the firmware update file(s) to the APT 120 for distribution to the WDs 130A-N.

APT 120 may be any computing device, such as computing device 200 described with respect to FIG. 2. APT 120 may be communicatively coupled to user device 110 via communication path 112. APT 120 may also be communicatively coupled to wireless devices (WDs) 130A-N via respective communication paths 122A-122N.

APT 120 may be configured to receive the firmware update file(s) from the user device 110, and store the files in a memory of the APT. APT 120 may then be configured to transmit the update files to the WDs 130A-N based on a ranking, list, or other ordering of the WDs as described herein.

Communication paths 112 and 122A-N may be wired or wireless communication paths, and may be configured for communication via any appropriate protocol.

WDs 130A-N may be computing devices, such as computing device 200 described herein with respect to FIG. 2. It should be noted that WDs 130A-N may be any WiFi or wireless communication enabled devices, such as a wireless delegate unit, for example. In this disclosure, one or more examples may use the term WD. However other terms may be used as well, such as WiFi stations, clients, and more. Each WD may include a microphone, user interface, buttons, dials, or one or more other features. Further, each WD may be a battery powered device configured to transmit and receive information from the APT 120.

Each WD may include one or more sensors or components configured to gather information corresponding to the WD, such as information about a battery of the WD, connection status, software information, and more. In some examples, the battery information may include a current state of charge, past state of charge or history of the state of charge, number of charging cycles that the battery or WD have gone through, a time of the last charging cycle or since the battery was replaced, a battery age, temperature, or other metric, and various other information pertaining to the health and status of the WD battery.

The WD and/or APT 120 may also monitor a connection status between the WD and the APT. This may include determining whether the WD is connected or disconnected, various times or durations associated with the connection and disconnection of the devices, a strength of the signal between the devices, distance between the devices, and more. The WD and/or APT may be configured to transmit this gathered or determined information via the communication paths 122A-N.

In some scenarios, a user may employ a software update utility to select, apply, cancel, and provide the status of firmware updates of the WDs. The software update utility may run on the user device 110, APT 120, or on another device or system. Software update utility may also enable the user to select, cancel, and/or provide the status of updates for each WD, such as the percent completed, status of completion, and more.

In some examples, the APT 120 and/or user device 110 may dynamically order and sort WDs 130A-N that have been selected for a firmware update based on the battery life and connection status corresponding to each WD. In order to sort the WDs, this may include each WD transmitting information corresponding to the current battery state of charge, recharge cycles completed, and/or other WD information such as those described above. This information may then be used to order the WDs in a list, which the APT 120 and/or user device 110 can then use to process the firmware updates in sequence.

In some examples, the APT and/or user device may determine and monitor a connection status between each WD and the APT. The connection status may be connected, disconnected, strong/weak, and can include various corresponding information such as the time when a signal was lost, reestablished, and more.

Based on the battery information and the connection status information, the APT 120 and/or user device 110 may dynamically order and sort WDs in a WD update list. In some examples, all available WDs may be sorted in the list. Alternatively, the user may select a subset of the available WDs for an update. The user may select, for example, a subset of the WDs having an outdated firmware version, while leaving out or not selecting WDs that include a newest version.

In some examples, the ranking or order of the WDs may include determining a base or threshold level to which each WD is compared. For example, the threshold may correspond to remaining battery level or remaining state of charge measured in a time remaining till the battery is drained, a percentage of charge remaining, or some other metric. In some examples, the threshold may be set to 20 minutes of remaining battery life. This threshold may be determined based on the file size of the update to be completed, such that where the file size is larger than the threshold of remaining battery life. Some other update metric may be used as well or instead.

In one example, if the update for a given WD is expected to take 10 minutes to perform, the threshold may be determined to be two or three times that duration, equating to 20 or 30 minutes of battery life remaining. Other thresholds may be used as well.

Each WD may be compared to the threshold, as well as one or more other factors, to determine whether it should be at the top, bottom, middle, and/or in what order the WD should be relative to the other WDs selected for update. For example, any WD having a battery life less than the threshold may be put at the bottom of the WD update list or moved downward on the list. And any WD having a battery life above the threshold may be moved to the top of the list or upwards on the list. In addition, WDs having the least amount of remaining battery life above the threshold may be ranked higher than those having more battery life remaining. In this manner, the order of WDs on the WD update list may have the WD with the lowest battery life remaining above the threshold at the top of the list, followed by the second lowest battery life remaining, and so on until the WD having the highest battery life remaining. This WD may then be followed by the WD having the lowest battery life remaining below the threshold, and the second lowest, and so on. Alternatively, the WD having the highest battery life remaining may be followed by the WD having the highest battery life remaining below the threshold. Example rankings are shown in the table below.

Tables 1 and 2 below illustrate an example rankings of WDs A-H, based on the remaining battery life and connection status of each WD. Both tables reflect the same threshold of 20 minutes of battery life remaining. Table 1 shows that the lowest battery life WD above the threshold is first (WD A), followed by the second lowest above the threshold (WD B), and so on until the highest battery life remaining WD above the threshold (WD D). WD D is then followed by the WD having the lowest battery life remaining (WD E), and the second lowest (WD F), and so on. The list then ends with WD(s) having no connection or a bad connection to the APT (WD H).

Table 2 is similar to Table 1, however Table 2 shows a ranking in which the WD having the highest battery life remaining below the threshold (WD G) follows the WD having the highest battery life remaining (WD D). This can be seen in the different ordering of WDs E, F, and G.

TABLE 1

(Threshold = 20 min)

| WD | Batt. remaining |
|---|---|
| A | 25 min |
| B | 35 min |
| C | 150 min |
| D | 155 min |
| E | 3 min |
| F | 5 min |
| G | 18 min |
| H | No Connection |

TABLE 2

(Threshold = 20 min)

| WD | Batt. remaining |
|---|---|
| A | 25 min |
| B | 35 min |
| C | 150 min |
| D | 155 min |
| G | 18 min |
| F | 5 min |
| E | 3 min |
| H | No Connection |

Tables 1 and 2 illustrate two example rankings of the WDs on the list. It should be noted that many other ranking orders are possible, and may incorporate various other information. For instance, where a partial update is possible, WDs may be reorganized or ranked based on their ability to download the update from the APT (irrespective of their ability to execute the update). Other variations and considerations are possible as well.

As noted above, WDs that have lost connection may be put at the bottom of the ranking or moved down in the ranking. Alternatively, a WD that has lost connection may maintain its place in the ranking for a certain period of time, to allow for the connection to be reestablished. But if there is no reconnection after the period of time has elapsed, the WD may be moved to the end of the list or to a second 'error' list.

WDs that are already updated or have completed their update may be moved to the bottom of the list, or moved to a separate list of completed WDs. In some examples, there may be a plurality of lists created based on the outcome of an attempted update. For instance, WDs that fail due to a hardware issue may be moved to a specific list. Further, WDs that fail due to the battery being depleted may move to a separate list. Additional lists may be used for WDs that fail due to other factors, are completed, or fit into some other category of WD.

In addition to battery life remaining and connection status, one or more other factors may be used to move one or more WDs up and down the list(s).

When performing an update of all of the selected WDs, WDs at the top of the WD update list are updated first. As noted above, there may be an upper limit on the number of WDs that can be updated at the same time, due to bandwidth, processing, and other limitations. For instance, this limit may be three simultaneous WD updates based on the bandwidth required. And based on this limit, the three top ranked WDs may be updated first.

While the top ranked WDs are being updated, the system may continue to monitor and determine the ranking or list of the WDs. This may include moving one or more remaining WDs up or down the ranking based on lost connections, re-established or newly established connections, changes in battery status or state of charge, or for any number of other reasons. In some examples, a user may swap out batteries or recharge batteries of one or more WDs while the update process is occurring. The list may thus dynamically change based on the addition of new WDs to the system when one or more WDs have replaced batteries or as other actions are carried out.

When one or more of the top ranked WDs have completed their reception of the firmware update, or have completed the execution of the update, a next highest WD on the WD update list may have its update started. The completed WD may be moved to a separate 'completed' WD list, based on the outcome of the update. Alternatively if an error occurs during the update, the WD may be moved to an 'error' list based on the error that occurred. A next highest WD may then be updated.

When all WDs selected for update that are connected to the APT and have a battery level above the threshold are updated (or have received the update file), the system may then attempt to perform an update on the WDs having bad connections and/or battery levels below the threshold.

The process of updating and moving down the list may be repeated until all selected WDs are updated, have lost connection, have failed to update, have a low or depleted battery, or have another appropriate status. Ideally all WDs will be updated at the end. However the system described herein is configured to provide an efficient use of resources to update the plurality of WDs within the limits of bandwidth and battery life of the APT and WDs.

In some examples, the APT 120, WDs 130A-N, and user device 110 may be configured to operate such that there is no loss of any user configured settings on the APT or WDs. In addition, the system 100 may be configured such that only an administrator or other appropriate user can perform the firmware update operations. This may include password protection or other security measures to ensure that an update is not inadvertently started.

In some embodiments, the system 100 may be configured to prevent the APT and/or any of the WDs from being "bricked" or rendered unusable due to the update process. However the system 100 may also be configured to prevent normal device operations while the update process is in progress. This may include preventing or disabling audio transmission between the WDs and the APT during the update (i.e., for WDs that include a microphone).

The system 100 may also prevent or disable control by a user of the WDs and the APT during the update process. For example, the user interface of the APT and/or WDs may not allow a user to navigate or access their respective menus during the update, with a few exceptions. These exceptions may include enabling the user to access a Help function of the APT and/or WDs, as well as cancel updates while the updates are in progress.

In some examples, the system 100 may also be configured to provide information to a user via a user interface of the WDs, APT, and/or user device before, during, and after the update process has completed. This information can include a current status of the update, which WDs have not yet been updated, which are completed, which have failed, a percentage of WDs yet to start, completed, or failed, WDs that have low battery or partially completed updates, WDs that have lost connection, reestablished connection, have failed updates, hardware failures, and more.

System 100 may also be configured to shut down each WD after it has completed its corresponding firmware update. This can allow a user to start the update and leave while the update occurs, and be confident that the WDs will shut off and not waste battery after they have completed their updates.

In some examples, system 100 may enable a partial update to be completed for one or more of the WDs. A partial update for a given WD may include downloading the update file on the WD, but not executing the update itself. This may be done especially where there is limited battery life remaining, such that there is enough battery to download the update but not enough to execute it.

Partial updating of a WD in some cases can instead include downloading all or part of the update file, and performing part of the update. For instance if the update includes a first part corresponding to a screen of the WD, and a second part corresponding to some other feature of the WD, some examples may include downloading just the screen part of the update and executing the screen part. Alternatively, other examples may include downloading the entire update and only executing the screen part (or some other subset of the update).

System 100 may also include a secure connection between each WD and the APT, to enable connecting and/or reconnecting between the WD and APT. The reconnecting may be done based on a lost connection or battery swap that occurs during the update process.

In some examples, the system 100 may include the use of one or more concepts related to the Low-Power Wake-Up Radio (LP-WUR) developed by the IEEE 802.11ba Task Group (TGba). In particular, this may include the use of a secondary low power antenna in combination with a primary antenna in one or more of the devices of system 100 (e.g., the WDs, APT, and user device). The secondary antenna may be used to listen for a command to wake up the main radio when data is to be exchanged. Otherwise, the main radio may be left off to conserve battery life.

Further examples may include a particular use of a primary and a secondary radio in the APT. In this case, the primary radio may be used for transmitting data between the APT and one or more WDs during the update process. The secondary antenna may be used independently and/or simultaneously for the purpose of monitoring the wireless environment in which system 100 operates.

In some examples, the secondary antenna may be used to coordinate peer-to-peer updates between the WDs. After a first WD receives and/or executes an update from the APT via the primary radio, the secondary radio may be used to coordinate a peer-to-peer update between the first WD and one or more other WDs. The peer-to-peer updates may make use of communication channels between the WDs, shown in FIG. 1. At the same time, the main or primary radio can be used to start an update of a next WD on the list. In this manner, the number of simultaneous updates can be increased, thus saving battery life and completing updates to all of the devices more efficiently. Where transmission power (and thus data rates) are limited for one or more reasons, enabling a peer-to-peer update can also have the added benefit of allowing greater throughput and quicker overall update times.

FIG. 2 illustrates an example computing device 200 according to embodiments of the present disclosure. As noted above, one or more of the user device 110, APT 120, and WDs 130A-N may be computing device 200, and/or may have one or more features of computing device 200. In particular, FIG. 2 illustrates a simplified block diagram of an example computing device 200. Computing device 200 may be configured for performing a variety of functions or acts, such as those described in this disclosure (and accompanying drawings). Computing device 200 may include various components, including for example, a processor 210, memory 220, user interface 230, and communication interface 240, all communicatively coupled by system bus, network, or other connection mechanism 250. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device 200 may be physically remote and may be communicatively coupled to the computing device, via the communication interface 240 for example.

Processor 210 may include a general purpose processor (e.g., a microprocessor) and/or a special purpose processor (e.g., a digital signal processor (DSP)). Processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 220 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 220 includes multiple kinds of memory, particularly volatile memory and non-volatile memory.

The memory 220 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 220, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

User interface 230 may facilitate interaction with a user of the device. As such, user interface 230 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 230 may also comprise devices that communicate with inputs or outputs, such as a short-range transceiver (RFID, Bluetooth, etc.), a telephonic interface, a cellular communication port, a router, or other types of network communication equipment. The user interface 230 may be internal to the computing device 200, or may be external and connected wirelessly or via connection cable, such as through a universal serial bus port.

Communication interface 240 may be configured to allow the device 200 to communicate with one or more devices (or systems) according to one or more protocols. In one example, the communication interface 240 may be a wired interface, such as an Ethernet interface or a high-definition serial-digital-interface (HD-SDI). As another example, the communication interface 240 may be a wireless interface, such as a cellular, Bluetooth, or WI-FI interface.

In some examples, communication interface 240 may enable the computing device 200 to transmit and receive information to/from one or more other computing devices, such as user device 110, APT 120, and WDs 130A-N discussed with respect to FIG. 1.

Data bus 250 may include one or more wires, traces, or other mechanisms for communicatively coupling the processor 210, memory 220, user interface 230, communication interface 240, and/or any other applicable computing device component.

Figure 3A:
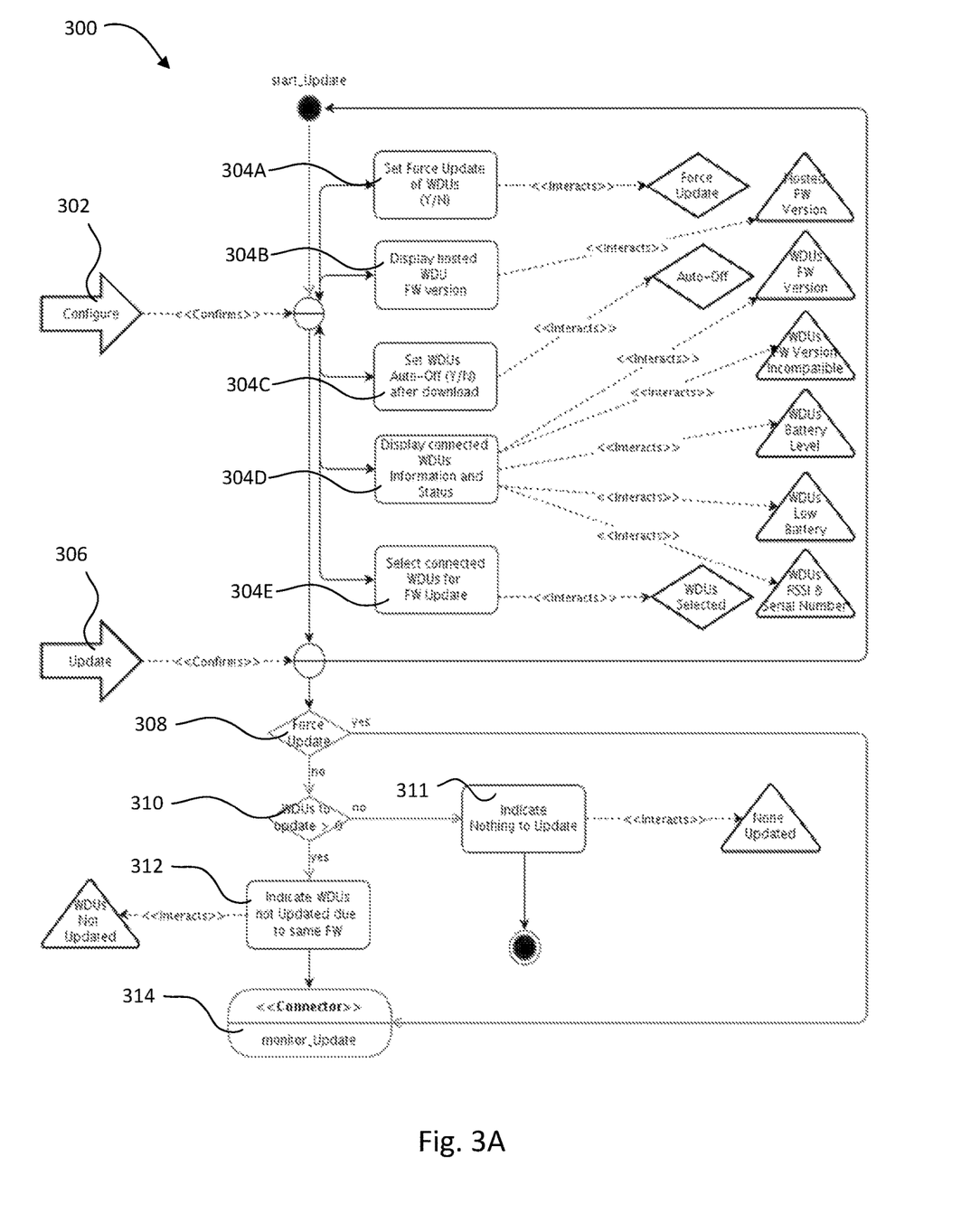
FIGS. 3A and 3B illustrate a flow chart of an example method in accordance with one or more embodiments.
Figure 3B:
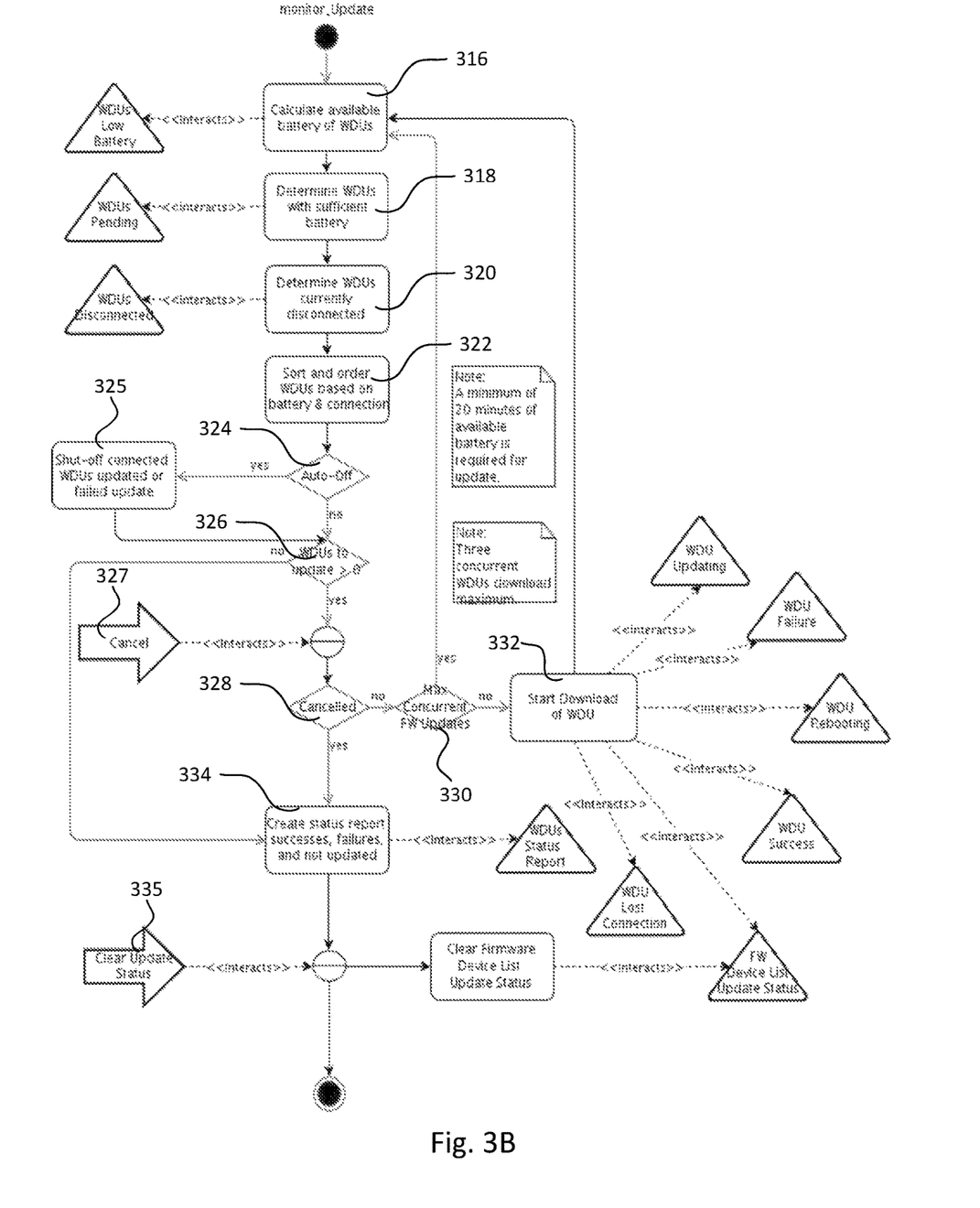

FIGS. 3A-B illustrate a flow chart of an example method 300 according to embodiments of the present disclosure. Method 300 may allow a user to initiate a large scale firmware update, efficiently making use of available resources to update the firmware on a plurality of networked computing devices. The flowchart of FIGS. 3A-B is representative of machine readable instructions that are stored in memory (such as memory 220) and may include one or more programs which, when executed by a processor (such as processor 210) may cause computing device 200 and/or one or more systems or devices to carry out one or more functions described herein. While the example program is described with reference to the flowchart illustrated in FIGS. 3A-B, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

At block 302, method 300 may include receiving an input command from a user to configure one or more settings or options of the update process. For example, the user may input a command to configure any of the blocks 304A-E, which correspond to setting an option to force WD updates (304A), displaying a hosted WD firmware version (304B), setting one or more WDs to automatically turn off after download (304C), displaying connected WDs information and status (304D), and selecting one or more connected WDs for the firmware update (304E).

In response to receiving any of the input commands of 304A-E, method 300 may include taking an appropriate action. For example, the responsive action may include storing information such as whether one or more WDs should be forced to update, turned off after the download, or have been selected for update. Further actions taken responsive to the inputs of blocks 304A-E may include displaying various information to the user, such as the hosted firmware version, WD firmware versions, whether the WD firmware versions are compatible, WD battery levels, whether one or more WDs have a low battery, and various WD metrics such as the serial number and RSSI values for a connection between the WD and another device (e.g., the APT).

At block 306, method 300 may include determining that an input command has been received to start the update. The input command may be from a user, a user device, or another system or device. At block 308, method 300 may include determining whether the user (or another system or device) has previously selected to force an update or not, at block 304A. If a forced update was selected, method 300 may proceed to block 314 and continue in FIG. 3B.

At block 310, method 300 may determine whether the number of WDs that are selected for update is greater than zero. If there are no WDs to update (for example because the WD(s) lack a connection, have low battery, or because none have been selected) method 300 may proceed to block 311 that states "Indicate Nothing to Update".

At block 312, method 300 may determine whether one or more WDs do not require an update because they are already updated or already have the same firmware version that is being used for the update. This information may then be displayed to a user.

At block 314, method 300 may begin updating one or more WDs. Method 300 continues in FIG. 3B.

At block 316, method 300 may include determining the available battery of one or more of the WDs, particularly those that have been selected for update. Method 300 may include transmitting a list and/or displaying a list of WDs that have a low battery. This may enable a user to swap out the battery or plug in the WDs that have low battery, so that they can be updated.

At block 318, method 300 may include determining one or more WDs that have sufficient battery life remaining. These WDs may be displayed to a user to provide an indication of which WDs are ready for the update.

At block 320, method 300 may include determining a connection status of one or more WDs, such as whether they are currently connected, disconnected, or have recently been connected or disconnected. These WDs may then be displayed to the user.

At block 322, method 300 may include sorting and/or ordering the WDs in a WD update list based on the determined battery life and connection status. This may be done in any suitable manner, including the ordering procedure described above with respect to Tables 1 and/or 2.

At block 324, method 300 may include determining whether it has previously been determined that the WDs should be automatically shut off after they are updated. If they have been selected for automatic shutdown, method 300 may include shutting off all connected WDs that are already updated, or have failed to update after an update attempt at block 325 that states "Shut-off connected WDUs updated or failed update".

At block 326, method 300 may include determining whether the number of WDs that still need to be updated is greater than zero. Block 328 may then determine whether a cancel command has been received. If a cancel command in block 327 has been received, method 300 may proceed to block 334, discussed in further detail below. But if no cancel command has been received, method 300 may proceed to block 330.

At block 330, method 300 may include determining whether the maximum number of concurrent WD updates are in progress. As noted above, bandwidth and processing limitation may limit the number of simultaneous or concurrent updates to three, or some other number of WDs. If the maximum number of updates are currently in progress, method 300 may proceed back to block 316.

If there are fewer than the maximum number of concurrent updates in progress, method 300 may include starting a download of the next highest WD on the WD update list. At block 332. Method 300 may also include determining, for the newly started update, whether the WD update is in progress, has failed, whether the WD is rebooting, has succeeded, has lost connection, and more. This information may be displayed to the user.

As noted above, the process of updating WDs, moving them up and down the list based on the battery level and connection status, and starting new updates based on the completion of updates for one or more WDs may be repeated until every WD selected for update has either completed the update, lost connection, or failed to update for some reason. After every selected WD has been processed in some way (completed update or not), the determination at block 326 may be that there are no more WDs to update. At this point, method 300 may proceed to block 334.

At block 334, method 300 may include creating a status report including the successes, failures, lost connections, and various other information pertaining to the WDs. This status report may be displayed to a user, so the user can see the result of the update process.

The user may then input a command to clear the update status in block 335, and method 300 may then end.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein.

The invention claimed is:

1. A system comprising:
a plurality of wireless devices configured to operate using battery power; and
a computing device remote from the plurality of wireless devices and configured to:
wirelessly communicate with one or more of the plurality of wireless devices;
determine a list ranking the plurality of wireless devices by ordering the plurality of wireless devices based on, for each wireless device, (1) a remaining battery life of that wireless device and (2) a remaining battery life threshold, such that a first wireless device having a first remaining battery life above the remaining battery life threshold is positioned at a first priority position of the list, and a second wireless device having a second remaining battery life above the remaining battery life threshold and above the first remaining battery life is positioned at a second priority position on the list; and sequentially update the plurality of wireless devices based on the list.

2. The system of claim 1, wherein determining the list further comprises ordering the plurality of wireless devices such that one or more wireless devices having a remaining battery life below the remaining battery life threshold are positioned at a lowest priority position on the list.

3. The system of claim 1, wherein the computing device is further configured to determine the remaining battery life threshold based on an expected time required to update a given wireless device.

4. The system of claim 1, wherein the remaining battery life threshold is twenty minutes.

5. The system of claim 1, wherein sequentially updating the plurality of wireless devices comprises:
transmitting an update to a top wireless device on the list; and
responsive to completing the transmittal, (i) moving the top wireless device to a completed list, and (ii) transmitting the update to a new top wireless device on the list.

6. The system of claim 1, wherein the computing device is further configured to determine the list based on a connection status of each wireless device.

7. The system of claim 6, wherein the computing device is further configured to:
detect a lost connection between a third wireless device and the computing device;
determine that the connection between the third wireless device and the computing device has not been reestablished within a threshold time; and
responsively move the third wireless device to a lowest priority position on the list.

8. The system of claim 1, wherein the computing device is further configured to update the list while transmitting an update to one or more of the plurality of wireless devices.

9. The system of claim 1, wherein the computing device is further configured to cause the plurality of wireless devices to shut down after completing their respective updates.

10. A method of updating a plurality of wireless devices comprising:
establishing wireless communication between a computing device and the plurality of wireless devices, wherein the plurality of wireless devices are configured to operate using battery power, and wherein the computing device is remote from the plurality of wireless devices;
determining a list ranking the plurality of wireless devices by, ordering the plurality of wireless devices based on, for each wireless device, (1) a remaining battery life of that wireless device and (2) a remaining battery life threshold, such that a first wireless device having a first remaining battery life above the remaining battery life threshold is positioned at a first priority position of the list, and a second wireless device having a second remaining battery life above the remaining battery life threshold and above the first remaining battery life is positioned at a second priority position on the list; and
sequentially updating the plurality of wireless devices based on the list.

11. The method of claim 10, wherein determining the list further comprises ordering the plurality of wireless devices such that one or more wireless devices having a remaining battery life below the remaining battery life threshold are positioned at a lowest priority position on the list.

12. The method of claim 10, wherein the computing device is further configured to determine the remaining battery life threshold based on an expected time required to update a given wireless device.

13. The method of claim 10, wherein sequentially updating the plurality of wireless devices comprises:
transmitting an update to a top wireless device on the list; and
responsive to completing the transmittal, (i) moving the top wireless device to a completed list, and (ii) transmitting the update to a new top wireless device on the list.

14. The method of claim 10, further comprising determining the list based on a connection status of each wireless device.

15. The method of claim 14, further comprising:
detecting a lost connection between a third wireless device and the computing device;
determining that the connection between the third wireless device and the computing device has not been reestablished within a threshold time; and
responsively moving the third wireless device to a lowest priority position on the list.

16. The method of claim 10, further comprising updating the list while transmitting an update to one or more of the plurality of wireless devices.

17. The method of claim 10, further comprising causing the plurality of wireless devices to shut down after completing their respective updates.

18. A non-transitory, computer-readable memory having instructions stored thereon that, when executed by a processor, cause the performance of a set of acts comprising:
establishing wireless communication between a computing device and a plurality of wireless devices, wherein the plurality of wireless devices are configured to operate using battery power, and wherein the computing device is remote from the plurality of wireless devices;
determining a list ranking the plurality of wireless devices by ordering the plurality of wireless devices based on, for each wireless device, (1) a remaining battery life of that wireless device and (2) a remaining battery life threshold, such that a first wireless device having a first remaining battery life above the remaining battery life threshold is positioned at a first priority position of the list, and a second wireless device having a second remaining battery life above the remaining battery life threshold and above the first remaining battery life is positioned at a second priority position on the list; and
sequentially updating the plurality of wireless devices based on the list.

* * * * *